United States Patent
Malan

(10) Patent No.: US 11,537,933 B2
(45) Date of Patent: Dec. 27, 2022

(54) USING MACHINE LEARNING TO ESTIMATE OR FORECAST RESOURCE USE WITH TIME-VARYING DEMAND IN GAMING PLATFORMS

(71) Applicant: Roblox Corporation, San Mateo, CA (US)

(72) Inventor: Arthur Remy Malan, Menlo Park, CA (US)

(73) Assignee: Roblox Corporation, San Mateo, CA (US)

( * ) Notice: Subject to any disclaimer, the term of this patent is extended or adjusted under 35 U.S.C. 154(b) by 1360 days.

(21) Appl. No.: 15/892,148

(22) Filed: Feb. 8, 2018

(65) Prior Publication Data

US 2019/0244137 A1    Aug. 8, 2019

(51) Int. Cl.
*G06N 3/08*      (2006.01)
*G06N 20/00*     (2019.01)

(52) U.S. Cl.
CPC ............... *G06N 20/00* (2019.01); *G06N 3/08* (2013.01)

(58) Field of Classification Search
CPC ....................................................... G06N 3/08
See application file for complete search history.

(56) References Cited

U.S. PATENT DOCUMENTS

| 9,923,785 B1 * | 3/2018 | Li ....................... H04L 41/5025 |
| 11,003,499 B1 * | 5/2021 | Abretske ............... A63F 13/358 |
| 2008/0082377 A1 | 4/2008 | Kennis et al. |
| 2012/0028606 A1 * | 2/2012 | Bobotek ............. H04W 12/128 455/411 |
| 2015/0213683 A1 | 7/2015 | Graham et al. |
| 2016/0260283 A1 | 9/2016 | Little et al. |
| 2018/0253661 A1 * | 9/2018 | Strauss .................. G06Q 50/01 |

FOREIGN PATENT DOCUMENTS

| EP | 3118784 | 1/2017 |
| WO | 2017/188419 | 11/2017 |

OTHER PUBLICATIONS

EPO, Extended European Search Report for European Application No. 19751106.6, dated Oct. 13, 2021, 14 pages.

(Continued)

*Primary Examiner* — Hal Schnee
(74) *Attorney, Agent, or Firm* — IP Spring

(57) ABSTRACT

A method and system is disclosed for training a machine learning model by generating first training input that includes a first number of reports at a first point in time. The reports are submitted by the users of the gaming platform and identify incidents where content of the gaming platform violates a policy of use associated with the gaming platform. The method and system generates second training input including a number of resources active at the first point in time. The method and system generates first target output identifies a number of resources sufficient to evaluate the target percentage of the first number of reports. The method and system provide the training data to train the machine learning model on (i) a set of training inputs comprising the first training input and the second training input, and (ii) a set of target outputs comprising the first target output.

20 Claims, 5 Drawing Sheets

(56) References Cited

OTHER PUBLICATIONS

Prodan, et al., "Prediction-based real-time resource provisioning for massively multiplayer online games", Future Generation of Computer Systems, vol. 25, No. 7, Jul. 1, 2009, pp. 785-793.
USPTO, International Search Report for International Patent Application No. PCT/US2019/016504, dated Apr. 22, 2019, 2 pages.
USPTO, Written Opinion for International Patent Application No. PCT/US2019/016504, dated Apr. 22, 2019, 6 pages.

* cited by examiner

USING MACHINE LEARNING TO ESTIMATE OR FORECAST RESOURCE USE WITH TIME-VARYING DEMAND IN GAMING PLATFORMS

TECHNICAL FIELD

This disclosure relates to the field of gaming platforms and, in particular, to using machine learning to estimate or forecast resource use with time-varying demand.

BACKGROUND

Collaboration platforms allow users to connect to and share information with each other via the Internet. Users of a collaboration platform, such as a gaming platform, may participate in multi-user gaming environments, design custom gaming environments, decorate avatars, or exchange virtual objects with other users, and so forth.

DESCRIPTION OF DRAWINGS

Various implementations of the disclosure will be understood more fully from the detailed description given below and from the accompanying drawings of various implementations of the disclosure.

DETAILED DESCRIPTION

Figure 1:
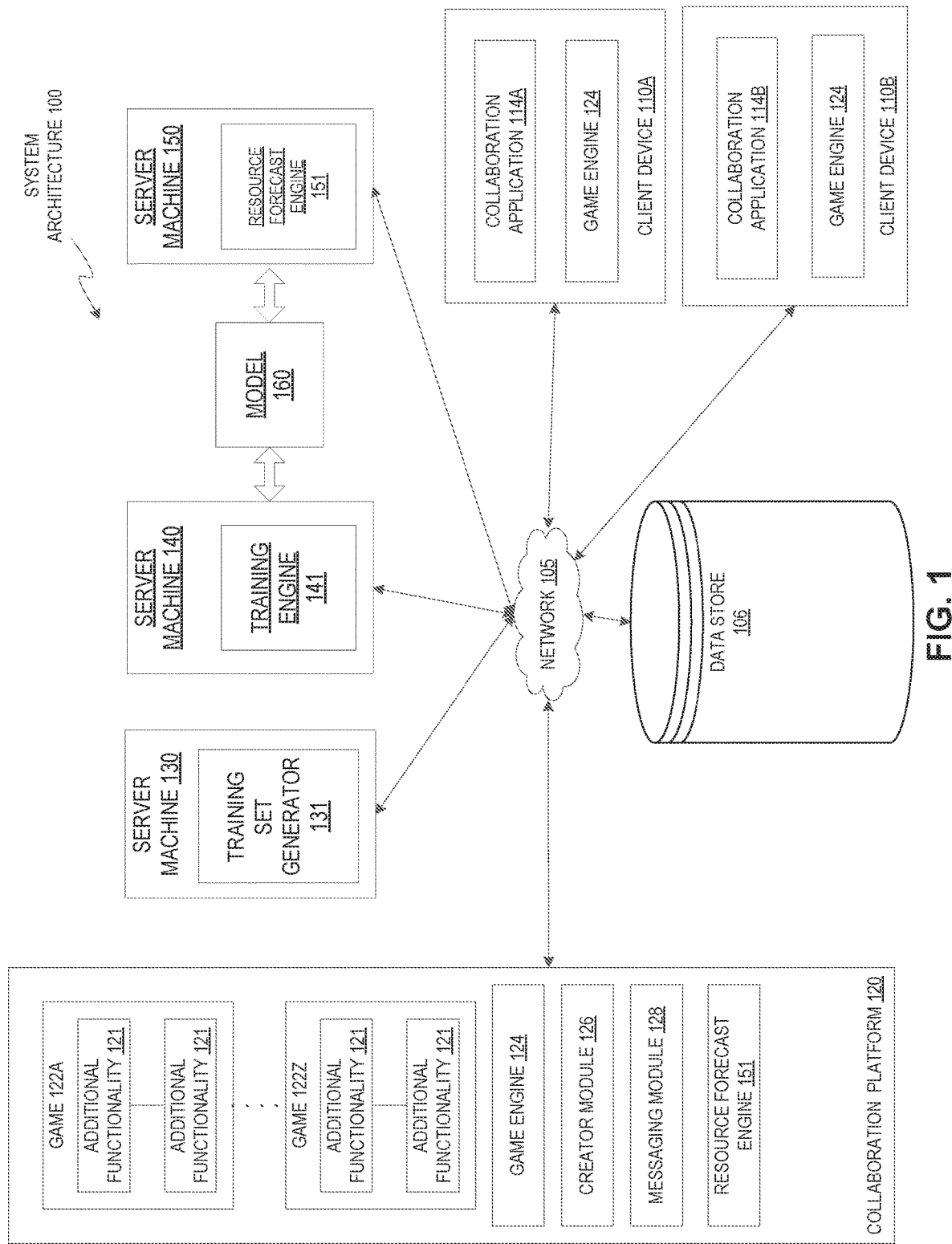
FIG. 1 illustrates an example system architecture, in accordance with implementations of the disclosure.

Collaboration platforms, such as gaming platforms, offer a variety of ways for users to interact with one another. For example, users of a gaming platform may work together towards a common goal, share various virtual gaming items, send electronic messages to one another, and so forth. Users of a collaboration platform may play games (e.g., playing users) with characters or create games or create game objects (e.g., creating users) with developmental tools via the collaboration platform. Users of a collaboration platform, such as creating users and playing users, may generate a tremendous amount of user-generated content (e.g., games, environments in games, character decorations such as clothing, messages between playing user, etc.) on the collaboration platform.

In some instances, a collaboration platform may implement a policy of use that sets standards or rules for user content or conduct. The policy of use may provide increased user interaction, improve user experience, increase security for technical infrastructure (e.g., protects the operation of the networks, servers, or other infrastructure of the collaboration platform), facilitate compliance with local, state, and federal laws, among others. A collaboration platform, such as a gaming platform, may have many users that are minors that pose particular challenges. For example, users that are minors may require or depend on stricter policy of use standards or demand greater enforcement of a policy of use.

In some collaboration platforms, users may submit reports to the collaboration platform that identify an incident where content (e.g., messages, game objects, game environment, etc.) violates the policy of use associated with the platform. The collaboration platform may allocated resources (e.g., server resources, data store resources, networking resources, etc.) in order to evaluate the reports, which may include investigating and assessing the merits of the report and performing any remedial measures (e.g., disabling a message application of an offending user, suspending an account of an offending user, etc.). Estimating the amount of resources able to handle the evaluation of reports may be challenging at least because the number of reports may vary over time, and the number of reports to be received may be unknown.

Additionally, in some instances a collaboration platform may decide or be obligated to evaluate a target percentage of the reports at any given time. The reports that are not handled may be put in a queue for subsequent evaluation (e.g., when resources are available). For example, a target percentage may be 5%. At a given point in time the number of reports may be 100, and the collaboration platform may be obligated to evaluate the target percentage of 5% of the 100 reports (e.g., 5 reports). An hour later, the number of reports may spike to 500 reports and the collaboration platform is still obligated to evaluate 5% of the 500 reports (e.g., 25 reports). The active or available resources may be insufficient to handle or evaluate the target number of reports when the number of reports increases. Alternatively, too many resources may be available when the number of reports is small and sit idle and be wasted.

Additionally, in some instances a collaboration platform may decide or be obligated to evaluate a certain percentage of reports at any given time. The reports that are not handled may not be useful at a later time and thus discarded. Additionally, the process for discarding reports may be subject to unknown or unmeasurable environmental factors and thus the number of reports discarded at any given time is not subject to simple computation and needs to be estimated in order to subsequently estimate what percentage of reports can be evaluated by a fixed set of resources.

Additionally, in some instances a collaboration platform may decide or be obligated to evaluate all reports. The reports are not handled immediately but are kept in a queue, such as a first-in, first-out queue, for subsequent processing. For a given number of incoming reports, and a fixed number of resources, it is useful to forecast the length of time it will take a report at any given time to work its way through the queue and be processed.

Aspects of the disclosure address the above-mentioned and other challenges by training a machine learning model using first training input indicative of a first number of reports at a first point in time, second training input including a number of resources active at the first point in time, and first target output that identifies a number of resources sufficient to evaluate the target percentage of the first number of reports at the first point in time. In some implementations, training data, such as training inputs and target outputs, may be generated at intervals (e.g., different points of time, such as 1 minute intervals) for a particular duration (e.g., for a period of time, such as 1 year) to train the machine learning model.

Once the machine learning model is trained, the trained machine learning model can be used to forecast or predict or estimate resource use or requirements for a future time period (e.g., next week), even though the actual number of reports over the future time period and the variation in the number of reports over the future time period is unknown. Additionally, the trained machine learning model may be used to troubleshoot a current situation or even past situation where the number of reports changes unexpectedly and the number of resources available to evaluate the reports is insufficient or too many.

Accordingly, aspects of the disclosure provide a way to estimate or forecast resource usage when demand for the resources varies over time. This increases the efficiency of collaboration platforms, and reduces the need for manual estimations of future resources use and for manual trouble shooting. Training a machine learning model to estimate resources sufficient to evaluate a target percentage of reports submitted by users of a collaboration platform where the number of reports vary over time, and using the trained machine learning model to provide an estimate of the number of resources to use in order to evaluate the target percentage of reports improves the technological process of estimating resource use with time-varying demand. For example, estimating future resource use without a machine learning model may be insufficient or inaccurate. Estimating resource use improves operation of a computer or computer network (e.g., more efficient) by reducing or eliminating additional idle resources (e.g., server resources) that are not needed to evaluate the target percentage of the reports.

It may be noted that a collaboration platform described as a gaming platform herein is provided for purposes of illustration, rather than limitation. A collaboration platform may be one or more of numerous platforms, such as a gaming platform, a social networking platform, purchasing platform, a messaging platform, creation platform, and so forth. It may be further noted that aspects of the disclosure are illustrated using an example of a gaming platform and for purposes of illustration, rather than limitation. It may be noted that aspects of the present disclosure may be applied to platforms generally, such as platforms that evaluate reports that identify an incident where content on the platform violates the policy of use associated with the platform.

It may be noted aspects of the present disclosure are described in view of reports submitted by the user. The use of reports is provided for purposes of illustration, rather than limitation. The system and method of training the machine learning model and using the trained machine model to estimate resources may be used to estimate resources to perform any type of work (e.g., computational work) that is to be performed by collaboration platform (and that varies over time). For example, the machine learning model may be trained to estimate the resources sufficient to perform a target percentage of work (e.g., computational work, such as generating rendering commands for gameplay) of a collaboration platform, even as the demand for the computational work varies over time.

FIG. 1 illustrates an example system architecture 100, in accordance with one implementation of the disclosure. The system architecture 100 (also referred to as "system" herein) includes client devices 110A and 110B (generally referred to as "client device(s) 110" herein), a network 105, a data store 106, a collaboration platform 120, and one or more server machines 130 through 150.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, and/or a combination thereof.

In implementations, data store 106 is persistent storage that is capable of storing data. In some implementations, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In implementations, the server machines 130-150 may be one or more computing devices (e.g., a rackmount server, a server computer, a router computer, a mainframe computer, a desktop computer, etc.). In implementations, the server machines 130-150 may be included in the collaboration platform 120, be an independent system, or be part of another system or platform.

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120. For example, users may access collaboration platform 120 using collaboration application 114 on client devices 110. It may be noted that collaboration application 114A and 114B may generally referred to as collaboration application(s) 114. In some implementations, collaboration application 114 may be two instances of the same application.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In implementations, "user" may be refer to a user of the collaboration platform 120 and include playing user that play games 122 or creating users that create games, environments, or gaming objects (e.g., shirts, hats, etc.).

In one implementation, collaboration platform 120 may be a gaming platform, such as an online gaming platform or virtual gaming platform. For example, the gaming platform may provide single-player or multi-player games to a community of users that may access or interact with the games 122A-122Z using client devices 110 via network 105. In implementations, games 122 (also referred to as "video game," "online game," or "virtual game" herein) may be two-dimensional (2D) games, three-dimensional (3D) games, virtual reality (VR) games, or augmented reality (AR) games, for example. In implementations, a game 122 may be played in real-time with other users of the game 122.

In some implementations, a game 122 can include an electronic file that can be executed or loaded using software, firmware or hardware configured to present the game content (e.g., digital media item) to an entity. In some implementations, a game 122 may be executed by a game engine 124 to generate a gaming video including multiple frames and audio. The gaming video may be generated (e.g., rendered) by the game engine 124 based on commands or user input. In some implementations, a game engine 124 (e.g., a rendering engine of the game engine 124) receives user input and generates a gaming video based on the user input. In some implementations, a game engine 124 (either local to the client device 110 or at collaboration platform 120) receives user input and generates commands (e.g., rendering commands, graphics library commands, etc.) based on the user input. In some implementations, a game engine 124 (e.g., a rendering engine of the game engine 124) receives from collaboration platform 120 the generated commands and generates the gaming video based on the generated commands. The gaming video may be displayed via a user interface of a client device 110.

In some implementations, collaboration platform 120 hosts games 122 and allows users to interact with the games 122 using collaboration application 114 of client devices 110. Users of collaboration platform 120 may play, create, interact with, or build games 122, or create and build objects (e.g., also referred to as "item(s)" or "game objects" or "virtual game item(s)" herein) of games 122. For example, in generating user-generated virtual items, users may create characters, decoration for the characters, one or more virtual environments for an interactive game, or build structures used in a game 122, among others. In implementations, users may buy, sell, or trade game virtual game objects, such as in-platform currency (e.g., virtual currency), with other users of the collaboration platform 120. In implementations, collaboration platform may transmit game content to collaboration applications 114. Game content (also referred to as "content" herein) may refer to any data or software instructions (e.g., game objects, messages between users, game, user information, video, images, commands, media item, etc.) associated with collaboration platform 120 or collaboration applications 114.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, rendering commands, user input, graphics library commands, etc.) to each of the client devices 110 to display interactions of the multiple users in a multi-player gaming environment. In another implementation, collaboration platform 120 may transmit the game content from one or more client devices 110 to another client device for the other client device to consolidate and display the game content. In another implementation, the collaboration platform 120 may receive the game content (e.g., first user transmitting user input via client device 110A and second user transmitting user input via client device 110B), generate game results (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user(s) with a game 122 using user account information (e.g., a user account identifier such as username and password).

In some implementations, collaboration platform 120 may include a game engine 124. In implementations, game engine 124 may be used for the development or execution of games 122. For example, game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics, among other features. In some implementations, an instance of game engine 124 may be included on client devices 110. In some implementations, game engine 124 of client devices 110 may work independently, in collaboration with game engine 124 of collaboration platform 120, or a combination of both.

In implementations, collaboration platform 120 may include a creator module 126. In implementations, creator module 126 may allow users to become creators (e.g., creating users) to design or create environments in an existing game 122 or create new games or create new game objects within games or environments. In some implementations, a game 122 may have a common set of rules or common goal, and the environments of a game 122 share the common set of rules or common goal. In implementations, different games may have different rules or goals from one another. In some implementations, games may have one or more environments (also referred to as "gaming environments" or "virtual environment" herein) where multiple environments may be linked. For example, a user may build a virtual environment that is linked to another virtual environment created by another user. A character of the virtual game may cross the virtual border to enter the adjacent virtual environment. In implementations, game objects (e.g., also referred to as "item(s)" or "objects" or "virtual game item(s)" herein) may refer to objects that are used, created, shared or otherwise depicted in games 122 of the collaboration platform 120. For example, game objects may include a part, model, character, tools, weapons, clothing, buildings, vehicles, currency, flora, fauna, components of the aforementioned (e.g., windows of a building), and so forth.

In implementations, creator module 126 may allow a user to create, modify, or customize characters. In implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, and skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for view or use by other users of collaboration platform 120. It some implementations, creating, modifying, or customizing characters, other game objects, games 122, or game environments may be performed by a user using a user interface (e.g., developer interface) and with or without scripting (or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in data store 106. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, creator module 126 includes a unique personal build and publishing service for creating and administering games 122 and gaming environments on the Internet that allows users (also referred to as "creating users," "creators," "owners," or "owning users" herein) to create, own, or administrate games 122 and gaming environments using cloud-mediated computational resources, for example. In implementations, creator module 126 may use a user interface (also referred a "developer interface" herein) via collaboration application 114 to allow users access the functionality of creator module 126. In implementations, the developer interface may be part of collaboration application 114. For example, a developer interface of collaboration application 114 may allow a user access to a library of game objects that may be selected by the user to build a game environment or place game objects within a game 122 or environment. The user may publish their selected game objects via the developer interface so that the game objects are available to playing users of the game 122 or environment.

In implementations, collaboration platform 120 executing creator module 126 includes a user-interfacing website or application (e.g., collaboration application 114) where users may access online computational resources hosted by collaboration platform 120 for the purposes of building, administrating, editing, and interacting with personally owned games 122 or gaming environments. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114.

In implementations, creator module 126 may provide control of created games 122 and environments to owning users who may set administrative policy regarding who will be allowed to interact with the created game 122 or environment and who has the capability of modifying, editing, or interacting with the game 122 or environment. Users with administrative control may also be referred to as owning users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other collaborative or group associated online venues. In implementations, creator module 126 has administrative tools for setting such policies including or in addition to general rules for interaction within the game 122 or gaming environment.

In implementations, the client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web application (e.g., an application that operates in conjunction with a web browser) that can access, retrieve, present, and/or navigate content (e.g., virtual character in a virtual environment, etc.) served by a web server. In another example, collaboration application 114 may be a native application. The collaboration application 114 may render, display, and/or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be a collaboration platform application for users to build, create, edit, upload content to the collaboration platform 120 as well as interact with collaboration platform 120. As such, the collaboration applications 114 may be provided to the client devices 110A and 110B by collaboration platform 120. In some implementations, collaboration application 114 of client device 110 may include game engine 124. In some implementations, game engine 124 of client device 110 may be separate from collaboration application 114.

In implementations, a user may login to collaboration platform 120 via collaboration application 114. The user may access a user account by providing user account information (e.g., username and password) where the user account is associated with one or more characters available to participate in one or more games 122 of collaboration platform 120.

In general, functions described in one implementation as being performed by the collaboration platform 120 can also be performed on the client devices 110A through 110B, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages (e.g., text, images, music, movies, etc.) among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120.

In some implementations, server machine 130 includes a training set generator 131 that is capable of generating training data (e.g., a set of training inputs and a set of target outputs where "set" may refer to one or more of something) to train a machine learning model. Some operations of training set generator 131 are described in detail below with respect to FIGS. 2-3.

In some implementations, server machine 140 includes a training engine 141 that is capable of training a machine learning model 160 using the training data from training set generator 131. The machine learning model 160 may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the machine learning model 160 that captures these patterns. The machine learning model 160 may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network (e.g., a regression neural network), even though some implementations might employ an SVM or other type of learning machine instead of, or in addition to, a neural network.

In some implementations, the training set is obtained from server machine 130. Server machine 150 includes a resource forecast engine 151 that provides current data as input to trained machine learning model 160 and runs trained machine learning model 160 on the input to obtain one or more outputs, as described in detail below with respect to FIG. 4.

In some implementations, training set generator 131 provides training data to training engine 141 to estimate resources sufficient to evaluate a target percentage of reports submitted by users of a collaboration platform 120 where a number of the reports vary over time. In some implementations, the training set generator 131 may generate first training input that includes a first number of reports at a first point in time. The reports are submitted by the users of the gaming platform and identify incidents where content of the collaboration platform 120 violates a policy of use associated with the gaming platform. Training set generator 131 may generate second training input that includes a number of resources active at the first point in time. Training set generator 131 may generate first target output for the first training input and the second training input. The first target output identifies a number of resources sufficient to evaluate the target percentage of the first number of reports.

In some implementations, resource forecast engine 151 provides input to the trained machine learning model 160 such as an indication of a time period during which the target percentage of a first number of reports is to be evaluated. The first number reports are submitted by the users of the collaboration platform 120 and identify incidents where content (e.g. user-generated game, user-generated game object, user dialog such as messages or voice, etc.) of the collaboration platform 120 violates a policy of use associated with the collaboration platform 120. Using the input with the trained machine learning model 160, the trained machine learning model 160 may produce one or more outputs identifying (i) a number of resources to evaluate the target percentage of the number of reports during the time period, and (ii) a level of confidence that the number of resources is sufficient to evaluate the target percentage of the number reports during the time period. The confidence data (e.g., level of confidence) may be used to generate a forecast that estimates the number of resources to use in order to evaluate the target percentage of reports during the time period. In some implementations, the confidence data may be used to generate a forecast report for presentation to an administrator or used automatically allocate the number of resources to evaluate the target percentage of reports during the time period (or idle or re-allocate excess capacity).

In implementations, resources may refer to something that is capable of performing work. In some implementations, resources may refer to computer or computational resources, such as processing devices, memory device, servers, data stores, networking resources, or the like. In some implementations, resources may refer to human resources such as employees and employees. For example, reports may be evaluated by humans and the number of humans may be estimated so the target percentage of reports submitted by users of the gaming platform.

In some implementations, confidence data may include or indicate a level of confidence that a number of resources are sufficient to evaluate a target percentage (e.g., between 0% and 100%) of the reports during the time period. In one example, the level of confidence is a real number between 0 and 1 inclusive, where 0 indicates no confidence the number of resources is sufficient to evaluate the target percentage of reports and 1 indicates absolute confidence the number of resources is sufficient to evaluate the target percentage of reports during a particular time period (e.g., absolute confidence that a minimum number of resources are sufficient to evaluate the target percentage of reports during a time period).

It may be noted that in some other implementations, the functions of server machines 130, 140, and 150 or collaboration platform 120 may be provided by a fewer number of machines. For example, in some implementations server machines 130 and 140 may be integrated into a single machine, while in some other implementations server machines 130, 140, and 150 may be integrated into a single machine. In addition, in some implementations one or more of server machines 130, 140, and 150 may be integrated into the collaboration platform 120.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
FIG. 2 is an example of a training set generator to create training data for a machine learning model, in accordance with implementations of the disclosure

FIG. 2 is an example of a training set generator to create training data for a machine learning model, in accordance with implementations of the disclosure. System 200 may include similar components as system 100, as described with respect to FIG. 1. Components described with respect to system 100 of FIG. 1 may be used to help describe system 200 of FIG. 2.

In implementations, training set generator 131 generates training data that includes one or more training inputs 230, and one or more target outputs 240. The training data may also include mapping data that maps the training inputs 230 to the target outputs 240. Training inputs 230 may also be referred to as "features," "attributes," or "information." In some implementations, training set generator 131 may provide the training data in a training set, and provide the training set to the training engine 141 where the training set is used to train the machine learning model 160. Generating a training set may further be described with respect to FIG. 3.

In some implementations, training inputs 230 may include training inputs 230A through 230N. Training input 230A may include a first number of reports at a first point in time. For example, 400 reports may be currently open at 2:30:00 P.M. on Dec. 28, 2017.

It may be noted that for purposes of illustration, rather than limitation, training inputs (and associated target outputs) may be organized or otherwise associated with a point in time, as illustrated by training inputs 230A-230E associated with a first point in time 231. The point in time associated with the training input and target outputs may be reflective of a state of collaboration platform 120 (with respect to the number of reports, active resources, etc.) at the particular point in time. For example, the training inputs 230A-230E may be associated with a first point in time, which reflect the state of the collaboration platform 120 at the first point in time (e.g., 2:30:00 P.M. on Dec. 28, 2017). The training inputs 230F through 230J may be associated with a second point in time and reflect the state of the collaboration platform 120 at the second point in time, and so forth. In some implementations, the points in time of the training data may be identified by a time stamp that includes information such Month, Day, Year and time of day (e.g., 2:30:00 P.M.). It may be noted that the point in time may have any level of granularity (e.g., down to the minute, the second, etc.). For example, the first number of reports at first point in time may include all the open reports (e.g., not including reports that were previously submitted but subsequently disposed) at 2:30:00 P.M. on Dec. 28, 2017. The second number of reports at a second point in time may include all the open reports at 2:31:00 P.M. on Dec. 28, 2017.

In some implementations, training data such as training inputs and target outputs may be generated or collected at intervals for a particular duration or time period. For example, training data may be generated in 1 minute intervals for 6 months. Each set of training inputs (e.g., training inputs 230A-230E) and associated output (e.g., target output 240A) are generated for at each 1 minute interval (e.g., point in time) for 6 months (e.g., time period). It may be noted that any interval (1 second, 1 minute, 1 hour, 1 day, etc.) or point in time may be used and may be determined based on the particular implementation or application. In some implementations, the points in time may be successive points in time. For example, the first point in time may be 2:30:00 P.M. on Dec. 28, 2017, the second point in time may be 2:31:00 P.M. on Dec. 28, 2017, the third point in time may be 2:32:00 P.M. on Dec. 28, 2017, and so forth.

In some implementations, the reports are user-generated reports that identify incidents where content (e.g., messages, game objects, game environment, etc.) violates a policy of use associated with the collaboration platform 120. For example and as noted above, the collaboration platform 120 may have a policy of use that sets standards or rules for user content and conduct. To enforce the policy of use, the collaboration platform 120 may use both technical detection technology (e.g., inappropriate image detection) and user-submitted reports. For example, a user may report that a specific chat or other content violates the policy of use, and submit a report to the collaboration platform 120 via collaboration application 114 to report the incident. The report may identify one or more of the submitting user (e.g., the user submitting the report), the offending content, the offending user (if applicable), the game that includes the offending content, or a category of report that identifies a type of violation (as described with respect to training input 230E). It may be noted that the term "reports" or "open reports" refers to open reports that are being evaluated or in queue to be evaluated (i.e., not closed), unless otherwise described. It may be further noted that closed reports have been disposed (e.g., have been evaluated, remedied, and removed from queue, etc.) and are referred to as "closed reports" herein, unless otherwise described. It may be noted and as noted above that evaluating reports may include investigating and assessing the merits of the report and performing any remedial measures (e.g., disabling a message application of an offending user, suspending an account of an offending user, etc.). Subsequent to reports being evaluated, the reports are closed and do not count towards the number of reports.

In some implementations, training input 230B may include a number of resources active at the first point in time. The number of active resources may include all the resources that are present (e.g., number of workers) or all the resources that are operating and available for use (e.g., number of servers that are available to perform a task). For example, the number of resources active at the first point in time may include the 10 staff members (e.g., employees or contractors) that are working at 2:30:00 P.M. on Dec. 28, 2017. In another example, the number of resources active at the first point in time may include 20 servers are at 2:30:00 P.M. on Dec. 28, 2017 and that available to evaluate reports and are currently evaluating reports.

In some implementations, training input 230C may include a percentage of the first number of reports that are being evaluated at the first point in time by the number resources active at the first point in time. For example, of the 400 open reports at 2:30:00 P.M. on Dec. 28, 2017, 10 reports are currently being evaluated by 10 working staff members or 10 active servers.

In some implementations, training input 230D includes an indication of a rate of change between the first number of reports at the first point in time and another number of reports at a previous point in time. In some implementations, the previous point in time may be an immediately previous point in time. In other implementations, the previous point in time need not be the immediately previous point in time. The rate of change may indicate a direction or magnitude of change of the number of reports over a time period. In some implementations, the derivative may be used to determine the rate of change. For example, at the first point in time (e.g., 2:30:00 P.M. on Dec. 28, 2017) the number of open reports is 400 and at the previous point in time (2:29:00 P.M. on Dec. 28, 2017) the number of open reports is 300. The rate of change may be +100 reports per minute (e.g., (400 reports-300 reports)/(2:30:00 P.M.-2:29:00 P.M.)). It may be noted that the rate of change may be determined in various ways. In a general form, rate of change may indicate a direction of change in the number of reports over a time period.

In some implementations, training input 230E may include an identifier of a category of each of the first number of reports. As noted above, a user may submit are report that indicates a type or category of an incident. For example, the category of report may be a request for personal information (e.g., full name, email, address, telephone number, other personally identifiable information), harassment and cyber-bullying (e.g., stalk, bully, hurt, attack, or humiliate a person or something a person cares about), child endangerment (e.g., actions that put children in inappropriate or dangerous situations), hate speech or actions (e.g., discriminatory speech or actions based on race, national origin, religion, disability, disease, gender, gender identity, sexual orientation, age, or veteran status), impersonation or defamation (e.g., use of name, username, position, digital representation, post or comment, or personal information to pass oneself off as that person), threats or self-harm, looking for dates or dating partners, sexual content or overly violent content, or dangerous, unethical, and illegal activities (e.g., hacking, phishing, spam, gambling, criminal activity, illegal drugs, blackmail, sale of drugs, alcohol, or tobacco to minors). In some implementations, some categories of reports are prioritized over others. For example, reports of child endangerment may have a higher priority than reports of defamation and are to be evaluated based on priority.

In some implementations, the target output 240A may be associated with training inputs 230A-230E. In some implementations, target output 240A identifies a number of resources sufficient to evaluate the target percentage of the first number of reports. For example, the target percentage of reports to evaluate may be 5%. If 400 reports are open at the first point in time, the target percentage of reports to evaluate is 20 reports. The number of resources sufficient to evaluate the 20 reports at the first time period (e.g., 2:30:00 P.M. on Dec. 28, 2017) may be 20 staff members or 10 servers, for example.

In some implementations, a sufficient number of resources to evaluate the target percentage of reports may be a minimum number of resources that are capable handling the work load, e.g. evaluation of reports. For example, if 9 servers are insufficient to handle the work load, and 10 or more servers are sufficient to handle the work load, the minimum number of resources that are capable to evaluate the target percentage of reports is 10 servers. In other implementations, a sufficient number of resources to evaluate the target percentage of reports may be a minimum number or resources that are capable handling the work load plus some amount additional resources (e.g. 12 servers).

In some implementations, the target percentage of reports to evaluate at any given point in time is a constant percentage. For example, collaboration platform 120 may establish a target percentage of 5% so that at any given time, and irrespective of a changing number of open reports, 5% of the open reports are to be evaluated at any given point in time during a period of time (e.g., 1 week, 1 year, etc.). It may be noted that the number of open reports may, if not likely, vary over time.

In some implementations, training input 230 may include training inputs 230F through 230J. Training inputs 230G, 230H, and 230I are not shown in FIG. 2 but are implied by the ellipses between training inputs 230F and 230J. Training inputs 230F through 230J may be similar to respective ones of training inputs 230A through 230E but for the period of time is different. For example, training inputs 230A-230E are associated with a first period of time, and training inputs 230F-230J are associated with a second time period. It may also be noted that that target output 240B may be similar to target output 240A but for target output 240B is associated with the second period of time and training inputs 230F-230J, rather than the first period of time and training inputs 230A-230E.

In some implementations, training data associated with one or more time periods may be provided to training set generator 131. As shown, training inputs 230 include training data associated with N number of points in time (e.g., training inputs 230K-230N) and target outputs may also include associated target outputs 240N. It may be noted that training data for different periods of time may be used to sufficiently train the machine learning model.

Figure 3:
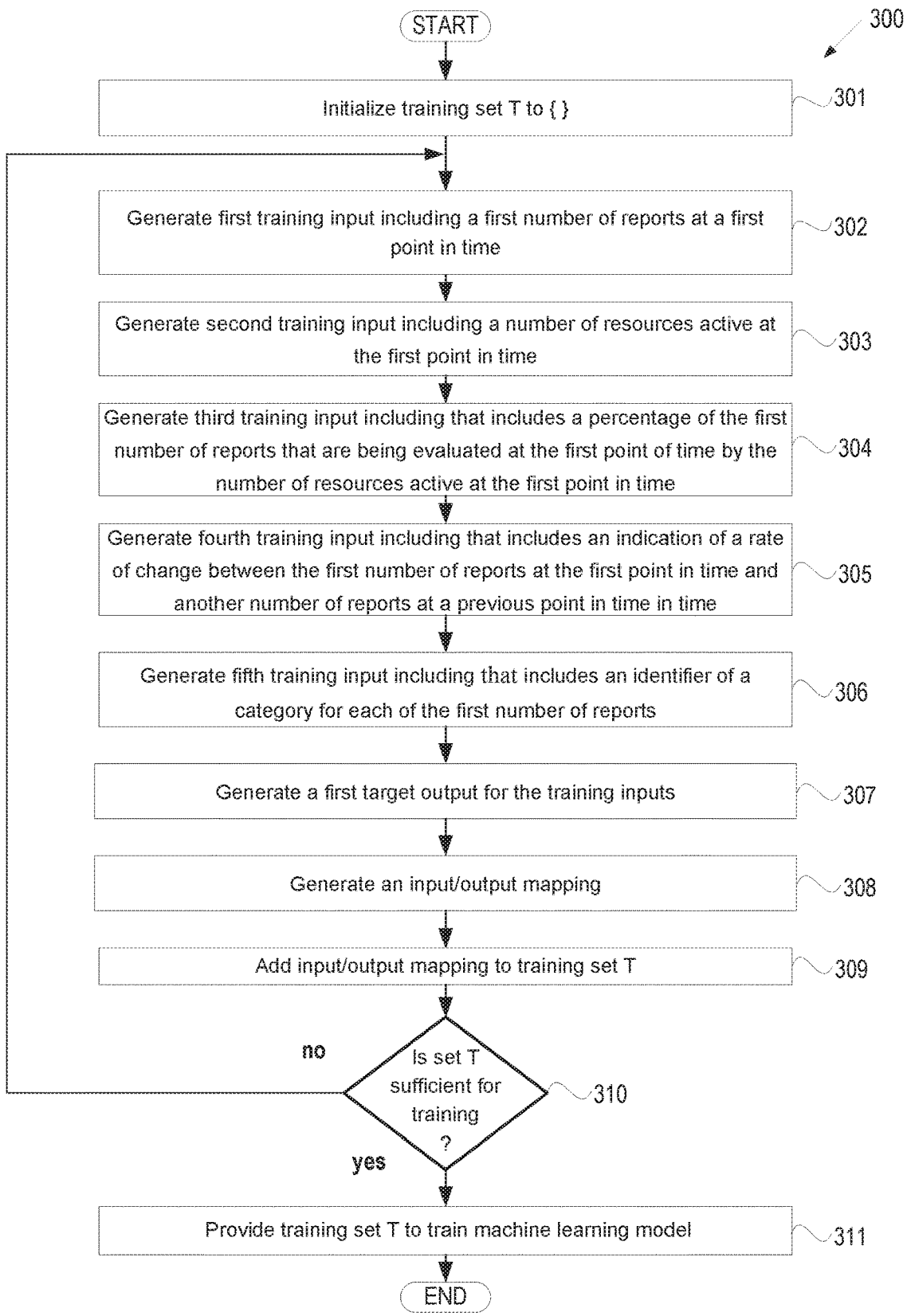
FIG. 3 depicts a flow diagram of one example of a method for training a machine learning model, in accordance with implementations of the disclosure.

FIG. 3 depicts a flow diagram of one example of a method 300 for training a machine learning model, in accordance with implementations of the disclosure. The method is performed by processing logic that may include hardware (circuitry, dedicated logic, etc.), software (e.g., instructions run on a processing device), or a combination thereof. In one implementation, some or all the operations of method 300 may be performed by one or more components of system 100 of FIG. 1. In other implementations, one or more operations of method 300 may be performed by training set generator 131 of server machine 130 as described with respect to FIGS. 1-2. It may be noted that components described with respect FIGS. 1-2 may be used to help illustrate aspects of FIG. 3. In some implementations, the operations of the blocks of method 300 may be performed in the same or different order, or the same, fewer, additional, or different operations may be performed.

Method 300 generates training data for a machine learning model. The machine learning model may be trained to estimate resources sufficient to evaluate a target percentage of reports submitted by users of a gaming platform where a number of the reports vary over time. In some implementations, at block 301 processing logic implementing method 300 initializes a training set T to an empty set.

At block 302, processing logic generates first training input that includes a first number of reports at a first point in time (as described with respect to FIG. 2). The reports are submitted by users of collaboration platform 120 and identify incidents where content of the gaming platform violates a policy of user associated with the collaboration platform 120.

At block 303, processing logic generates second training input including a number of resources active at the first point in time (as described with respect to FIG. 2).

At block 304, processing logic generates third training input that includes a percentage of the first number of reports that are being evaluated at the first point of time by the number of resources active at the first point in time (as described with respect to FIG. 2).

At block 305, processing logic generates fourth training input that includes an indication of a rate of change between the first number of reports at the first point in time and another number of reports at a previous point in time (as described with respect to FIG. 2).

At block 306, processing logic generates fifth training input that includes an identifier of a category for each of the first number of reports (as described with respect to FIG. 2).

At block 307, processing logic generates a first target output for one or more of the training inputs (e.g., training inputs one through five). The first target output identifies a number of resources sufficient to evaluate the target percentage of the first number of reports at the first point in time.

At block 308, processing logic optionally generates mapping data that is indicative of an input/output mapping. The input/output mapping (or mapping data) may refer to the training input (e.g., one or more of the training inputs described herein), the target output for the training input, and an association between the training input(s) and the target output.

At block 309, processing logic adds the mapping data generated at block 306 to training set T.

At block 310, processing logic branches based on whether training set T is sufficient for training machine learning model 160. If so, execution proceeds to block 311, otherwise, execution continues back at block 302. It should be noted that in some implementations, the sufficiency of training set T may be determined based simply on the number of input/output mappings in the training set, while in some other implementations, the sufficiency of training set T may be determined based on one or more other criteria (e.g., a measure of diversity of the training examples, accuracy, period of time etc.) in addition to, or instead of, the number of input/output mappings. If execution continues back at block 302, processing logic may repeat the generation of training inputs (e.g., block 302-306) and target outputs (e.g., block 307) for one or more additional points of time for a period of time, until the training set T is deemed sufficient. For example, training data may be generated at intervals of 1 minute for 1 year and used to train machine learning model 160.

At block 311, processing logic provides training set T to train machine learning model 160. In one implementation, training set T is provided to training engine 141 of server machine 140 to perform the training. In the case of a neural network, for example, input values of a given input/output mapping (e.g., numerical values associated with training inputs 230) are input to the neural network, and output values (e.g., numerical values associated with target outputs 240) of the input/output mapping are stored in the output nodes of the neural network. The connection weights in the neural network are then adjusted in accordance with a learning algorithm (e.g., back propagation, etc.), and the procedure is repeated for the other input/output mappings in training set T. After block 311, machine learning model 160 can be trained using training engine 141 of server machine 140. The trained machine learning model 160 may be implemented by resource forecast engine 151 (of server machine 150 or collaboration platform 120) to generate a forecast that estimates the number of resources to use in order to sufficiently evaluate the target percentage of the number of reports during the time period.

Figure 4:
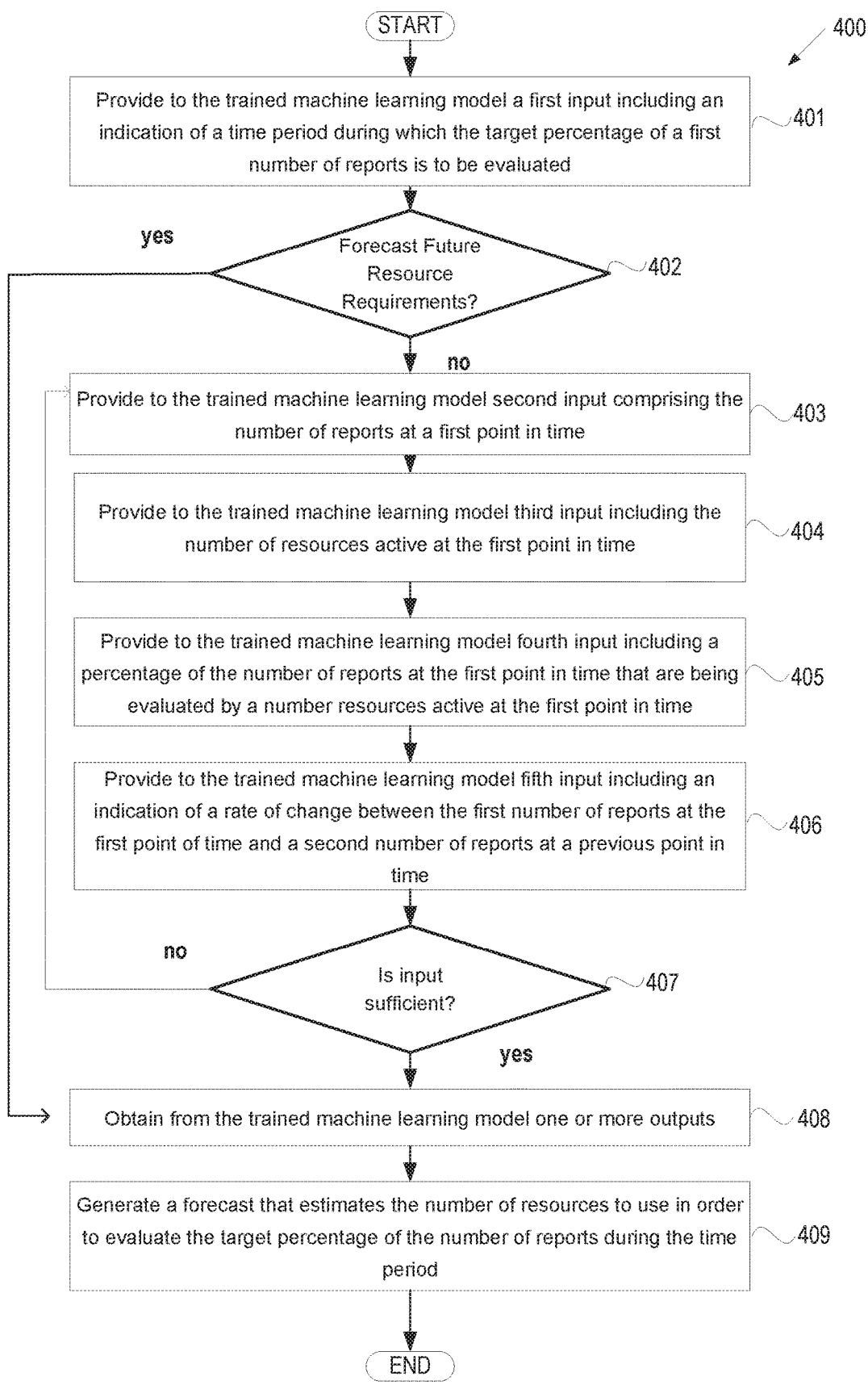
FIG. 4 depicts a flow diagram of one example of a method for using the trained machine learning model to estimate resources use with time-varying demand in a gaming platform, in accordance with implementations of the disclosure.

FIG. 4 depicts a flow diagram of one example of a method 400 for using the trained machine learning model, in accordance with implementations of the disclosure. The method is performed by processing logic that may include hardware (circuitry, dedicated logic, etc.), software (e.g., instructions run on a processing device), or a combination thereof. In some implementations, some or all the operations of method 400 may be performed by one or more components of system 100 of FIG. 1. In other implementations, one or more operations of method 400 may be performed by resource forecast engine 151 of server machine 150 or collaboration platform 120 implementing a trained model, such as trained machine learning model 160 as described with respect to FIGS. 1-3. It may be noted that components described with respect FIGS. 1-2 may be used to help illustrate aspects of FIG. 4. In some implementations, the operations of the blocks of method 400 may be performed in the same or different order, or the same, fewer, additional, or different operations may be performed.

Method 400 may begin at block 401 where processing logic implementing method 400 provides to the trained machine learning model 160 a first input that includes an indication of a time period during which a target percentage of a first number of reports is to be evaluated. For example, an administrator may want to know an estimate of the resources that will be required or sufficient to handle a work load of reports for a given future period of time (e.g., what will the resource demand for next week be?). In some implementations, processing logic (or administrator) may not know ahead of time the number of reports to evaluate during the time period (e.g., the first number of reports to evaluate during the time period may be an unknown number). In some implementations, the processing logic (or administrator) may provide to the trained machine learning model 160 a first time period and the target percentage of the reports that are to be evaluated. As noted above, in some implementations, the target percentage may be refer to the percentage of reports at any given point in time of a time period that are to be evaluated by collaboration platform 120. As further noted above, in some implementations, the target percentage of the reports collaboration platform 120 is to evaluate may be a constant (e.g., at any point in time during the time period at least 5% of the open reports are being evaluated). In some implementations, the target percentage may be known by the trained machine learning model 160 and may not be used as an input to the trained machine learning model 160.

At block 402, processing logic determines whether to forecast the future resource requirements (e.g., is the time period a future time period?). If the determination is yes, processing logic proceeds to block 408 to obtain from the trained machine learning model 160 one or more outputs and (block 408) and generate a forecast that estimates the number of resources to use in order to evaluate the target percentage of the number of reports during the time period (block 409). For example and as noted above, an administrator may want to forecast the number or resources that may be used during some future time period where the number of reports during the future time period is unknown. The administrator may select a particular time period of interest (e.g., next week). The particular time period of interest may be provided to the trained machine learning model 160, the trained machine learning model 160 may use the input to provide one or more outputs, and the one or more outputs may be used to generate a forecast that estimates the number of resource to use in order to evaluate the target percentage of the number of reports at any point in time during the particular time period of interest (e.g., next week).

Returning to block 402, processing logic may alternatively determine not to forecast future resource requirements (e.g., the time period is not a future time period, but rather either a current or past time period). If the determination is no, processing logic proceeds to block 403. For example, an administrator (or collaboration platform 120) may determine that the current number of resources is not able to evaluate the target percentage of the current reports. In another example, the administrator (or collaboration platform 120) may determine that in the recent past, the number of resources was not able to evaluate the target percentage of reports. In both examples, the state of collaboration platform 120 at the time period in question (current or past time period) may be analyzed using one or more inputs to the trained machine learning model 160, where the inputs are used to generate one or more outputs, and an estimate of the required resources for the time period of interest.

At block 403, processing logic provides to the trained machine learning model 160 second input that includes the number of reports at a first point in time of the time period (e.g., present or past time period).

At block 404, processing logic processing logic provides to the trained machine learning model 160 third input that includes the number of resources active at the first point in time of the time period.

At block 405, processing logic provides fourth input including a percentage of the number of reports at the first point in time that are being evaluated by a number resources active at the first point in time of the time period.

At block 406, processing logic provides fifth input including an indication of a rate of change between the first number of reports at the first point of time and a second number of reports at a previous point in time of the time period. It may be noted that the operations of blocks 403 through 406 may be similar to counterpart blocks described with respect to FIG. 3.

At block 407, processing logic branches based on whether the input to the trained machine learning model 160 is sufficient for generating one or more outputs from trained machine learning model 160. If so, execution proceeds to block 408, otherwise, execution continues back at block 403. It should be noted that in some implementations, the sufficiency of input to trained machine learning model 160 may be determined based simply on the number of inputs, while in some other implementations, the sufficiency of inputs to the trained machine learning model 160 may be determined based on one or more other criteria (e.g., a measure of diversity of the inputs examples, accuracy, inputs that cover the entire period of time, level of confidence that the output of the trained machine learning model 160 exceeds a threshold, etc.) in addition to, or instead of, the number of inputs. If execution continues back at block 403, processing logic may repeat the providing of inputs (e.g., block 403-406) for additional points of time for the period of time, until the inputs are deemed sufficient. For example, inputs to the trained machine learning model 160 may be provided for intervals of 1 minute for the previous week (e.g., past time period).

At block 408, processing logic obtains from the trained machine learning model 160 one or more outputs identifying (i) a number of resources to evaluate the target percentage of the number of reports during the time period, and (ii) a level of confidence that the number of resources is sufficient to evaluate the target percentage of the number reports during the time period. For example, the outputs of the trained machine learning model 160 may identify that during a particular day (e.g., time period) at least 20 servers are required to evaluate 5% of the 400 reports (at any point in time) during the particular day (and a level of confidence associated with the estimate). In another example, the outputs of the trained machine learning model 160 may identify that number of servers required to evaluate 5% of the reports at each hour (or any other granularity) of the particular day (and a level of confidence associated with the estimate).

At block 409, processing logic generates a forecast that estimates the number of resources to use in order to evaluate the target percentage of the number of reports during the time period in view of the level of confidence. A forecast may be an estimate or prediction of the number of resources to use to evaluate the target percentage of the number of reports during the given time period.

In one implementation, to generate the forecast processing logic determines whether the level of confidence that the number of resources is sufficient to evaluate the target percentage of the number of reports during the time period exceeds a threshold level of confidence. Responsive to determining that the level of confidence that the number of resources is sufficient to evaluate the target percentage of the number of reports during the time period exceeds the threshold level, processing logic generates the forecast. In some implementations, the forecast may be a forecast report and be provided for presentation or display to an administrator, for example. In some implementations, the forecast may be used to automatically allocate or acquire resources sufficient to evaluate the target percentage of the number of reports during the time period (or terminate or idle any excess resources).

Figure 5:
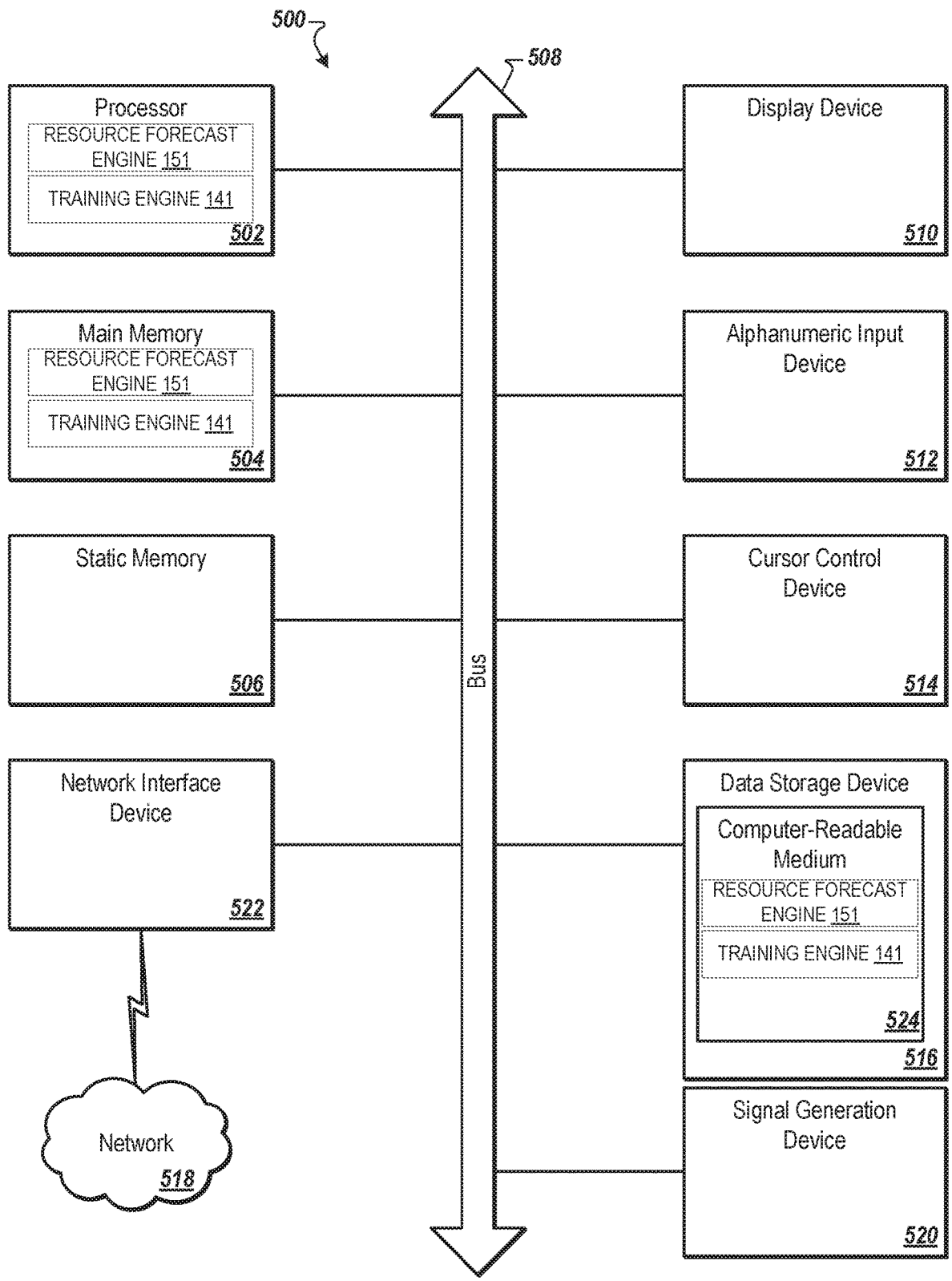
FIG. 5 is a block diagram illustrating an exemplary computer system, in accordance with implementations of the disclosure.

FIG. 5 is a block diagram illustrating an exemplary computer system 500, in accordance with implementations. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of resource forecast engine 151 or training engine 141. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and the resource forecast engine 151 or training engine 141 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 and resource forecast engine 151 or training engine 141 embodying any one or more of the methodologies or functions described herein. The sets of instructions of the system architecture 100 and resource forecast engine 151 or training engine 141 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operation s leading to a desired result. The sequence of operations is those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "determining," "generating," "providing," "obtaining," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

I claim:

1. A method to use a machine learning model to allocate computational resources sufficient to evaluate a target percentage of reports submitted by users of a gaming platform in which a number of the reports varies over time, the method comprising:

generating training data for the machine learning model, wherein generating the training data comprises:

generating first training input, wherein the first training input comprises a first number of reports at a first point in time, and wherein the first number of reports are submitted by the users of the gaming platform and identify incidents in which content of the gaming platform violates a policy of use associated with the gaming platform;

generating second training input, wherein the second training input comprises a first number of computational resources active at the first point in time; and generating first target output for the first training input and the second training input, wherein the first target output identifies a number of computational resources sufficient to evaluate the target percentage of the first number of reports;

providing the training data to train the machine learning model on (i) a set of training inputs comprising the first training input and the second training input, and (ii) a set of target outputs comprising the first target output; and allocating a particular number of computational resources to evaluate the target percentage of the number of reports, wherein the particular number of computational resources is determined by the trained machine learning model that receives the number of reports as input.

2. The method of claim 1, wherein generating the training data further comprises:

generating third training input, wherein the third training input comprises a percentage of the first number of reports that are being evaluated at the first point in time by the first number of computational resources active at the first point in time, and wherein the set of training inputs comprising the first, the second, and the third training inputs.

3. The method of claim 2, wherein generating the training data further comprises:

generating fourth training input, wherein the fourth training input comprises an indication of a rate of change between the first number of reports at the first point in time and another number of reports at a previous point in time, and wherein the set of training inputs comprising the first, the second, the third, and the fourth training inputs.

4. The method of claim 3, wherein generating the training data further comprises:

generating fifth training input, wherein the fifth training input comprises an identifier of a category for each of the first number of reports, and wherein the set of training inputs comprising the first, the second, the third, the fourth, and the fifth training inputs.

5. The method of claim 4, wherein generating the training data further comprises:

generating sixth training input, wherein the sixth training input comprises a second number of reports at a second point in time;

generating seventh training input, wherein the seventh training input comprises a number of computational resources active at the second point in time; and generating second target output for the sixth training input and the seventh training input, wherein the second target output identifies a number of computational resources sufficient to evaluate the target percentage of the second number reports, wherein the set of training inputs comprising the first, the second, the sixth and the seventh training inputs, and wherein the set of target outputs comprises the first target output and the second target output.

6. The method of claim 1, wherein the content of the gaming platform identified in the reports as violating the policy of use associated with the gaming platform comprises user-generated content.

7. The method of claim 1, wherein the computational resources comprise at least one of server resources or data store resources.

8. The method of claim 1, wherein the first number of reports varies over time, wherein the target percentage of the number of reports to evaluate at any point in time is a constant percentage, and wherein the number of computational resources active varies over the time.

9. The method of claim 1, wherein each training input of the set of training inputs is mapped to a target output of the set of target outputs.

10. A method to use a trained machine learning model to allocate computational resources to use in order to evaluate a target percentage of reports submitted by users of a gaming platform in which a number of the reports submitted varies over time, the method comprising:
providing, to the trained machine learning model, a first input comprising an indication of a time period during which the target percentage of a first number of reports is to be evaluated, wherein the first number reports are submitted by the users of the gaming platform and identify incidents in which content of the gaming platform violates a policy of use associated with the gaming platform;
obtaining, from the trained machine learning model, one or more outputs that identify (i) a number of computational resources to evaluate the target percentage of the number of reports during the time period, and (ii) a level of confidence that the number of computational resources is sufficient to evaluate the target percentage of the number reports during the time period; and
based on the one or more outputs of the trained machine learning model, allocating at least the number of computational resources to evaluate the target percentage of the number of reports, wherein the at least the number of computational resources is determined by the trained machine learning model that receives the number of reports as input.

11. The method of claim 10, further comprising:
generating a forecast that estimates the number of computational resources to evaluate the target percentage of the number of reports during the time period in view of the level of confidence.

12. The method of claim 11, where generating the forecast that estimates the number of computational resources to evaluate the target percentage of the number of reports during the time period in view of the level of confidence comprises:
determining whether the level of confidence that the number of computational resources is sufficient to evaluate the target percentage of the number of reports during the time period exceeds a threshold level of confidence; and
responsive to determining that the level of confidence that the number of computational resources is sufficient to evaluate the target percentage of the number of reports during the time period exceeds the threshold level, generating the forecast.

13. The method of claim 10, further comprising:
providing, to the trained machine learning model, second input comprising the number of reports at a first point in time of the time period.

14. The method of claim 13, further comprising:
providing, to the trained machine learning model, a third input comprising the number of computational resources which are active at the first point in time of the time period, a fourth input comprising a percentage of the number of reports at the first point in time that are being evaluated by the number of computational resources active at the first point in time, and a fifth input comprising an indication of a rate of change between the first number of reports at the first point in time and a second number of reports at a previous point in time.

15. The method of claim 10, wherein the first number of the reports to evaluate during the time period is an unknown number.

16. The method of claim 10, wherein the machine learning model was trained using a first training input comprising a first known number of reports at a first point in time, a second training input comprising a number of computational resources active at the first point in time, and a first target output for the first training input and the second training input, and wherein the first target output identifies a number of computational resources sufficient to evaluate the target percentage of the first known number of reports.

17. A system to use a trained machine learning model to allocate computational resources to use in order to evaluate a target percentage of reports submitted by users of a platform in which a number of the reports submitted varies over time, the system comprising:
a memory that stores instructions; and
a processing device, coupled to the memory, operable to execute the instructions to:
provide, to the trained machine learning model, a first input comprising an indication of a time period during which the target percentage of a first number of reports is to be evaluated, wherein the first number reports are submitted by the users of the platform and identify incidents in which content of the platform violates a policy of use associated with the platform;
obtain, from the trained machine learning model, one or more outputs that identify (i) a number of computational resources to evaluate the target percentage of the number of reports during the time period, and (ii) a level of confidence that the number of computational resources is sufficient to evaluate the target percentage of the number reports during the time period; and
based on the one or more outputs of the trained machine learning model, allocate at least the number of computational resources to evaluate the target percentage of the number of reports, wherein the at least the number of computational resources is determined by the trained machine learning model that receives the number of reports as input.

18. The system of claim 17, wherein the processing device is further operable to execute the instructions to:
generate an estimate of the number of computational resources to evaluate the target percentage of the number of reports during the time period in view of the level of confidence.

19. A system to use a machine learning model to allocate computational resources sufficient to evaluate a target percentage of reports submitted by users of a platform in which a number of the reports varies over time, the system comprising:
a memory that stores instructions; and
a processing device, coupled to the memory, operable to execute the instructions to:
generate training data for the machine learning model, wherein to generate the training data, the processing device is operable to execute the instructions to:
generate first training input, wherein the first training input comprises a first number of reports at a first point in time, and wherein the first number of reports are submitted by the users of the platform and identify incidents in which content of the platform violates a policy of use associated with the platform;

generate second training input, wherein the second training input comprises a first number of computational resources active at the first point in time; and generate first target output for the first training input and the second training input, wherein the first target output identifies a number of computational resources sufficient to evaluate the target percentage of the first number of reports;

provide the training data to train the machine learning model on (i) a set of training inputs comprising the first training input and the second training input, and (ii) a set of target outputs comprising the first target output; and allocate a particular number of computational resources to evaluate the target percentage of the number of reports, wherein the particular number of computational resources is determined by the trained machine learning model that receives the number of reports as input.

20. The system of claim 19, wherein to generate training data for the machine learning model, the processing device is further operable to execute the instructions to:

generate third training input, wherein the third training input comprises a percentage of the first number of reports that are being evaluated at the first point in time by the number of computational resources active at the first point in time, wherein the set of training inputs comprises the first, the second, and the third training inputs.

* * * * *